United States Patent
Rohde et al.

(10) Patent No.: US 9,267,613 B2
(45) Date of Patent: Feb. 23, 2016

(54) VALVE LOCKOUT DEVICE

(71) Applicant: Brady Worldwide, Inc., Milwaukee, WI (US)

(72) Inventors: Christopher J. Rohde, West Allis, WI (US); Jonathan Mantes, Milwaukee, WI (US)

(73) Assignee: BRADY WORLDWIDE, INC., Milwaukee, WI (US)

( * ) Notice: Subject to any disclaimer, the term of this patent is extended or adjusted under 35 U.S.C. 154(b) by 0 days.

(21) Appl. No.: 14/554,968

(22) Filed: Nov. 26, 2014

(65) Prior Publication Data

US 2015/0075648 A1  Mar. 19, 2015

Related U.S. Application Data

(63) Continuation-in-part of application No. 13/566,131, filed on Aug. 3, 2012, now Pat. No. 9,169,943.

(51) Int. Cl.
*F16K 35/10* (2006.01)

(52) U.S. Cl.
CPC .......... *F16K 35/10* (2013.01); *Y10T 137/7256* (2015.04)

(58) Field of Classification Search
CPC .......................... F16K 35/10; Y10T 137/7256
See application file for complete search history.

(56) References Cited

U.S. PATENT DOCUMENTS

| | | |
|---|---|---|
| 1,104,022 A | 7/1914 | Tuttle |
| 1,322,721 A | 11/1919 | Noonan |
| 3,914,965 A | 10/1975 | Paxton |
| 3,960,168 A | 6/1976 | Plympton |
| 3,980,099 A | 9/1976 | Youngblood |
| D242,521 S | 11/1976 | Plympton |
| D245,520 S | 8/1977 | Smith et al. |
| 4,126,023 A | 11/1978 | Smith et al. |
| 4,208,893 A | 6/1980 | Avrich et al. |
| 4,304,388 A | 12/1981 | Gates |

(Continued)

FOREIGN PATENT DOCUMENTS

JP        S57208380 A      12/1982

OTHER PUBLICATIONS

Brady Worldwide, Inc., Valve Lockout Product List, http://www.bradyid.com/bradyid/pbv/102222, Copyright 2012 Brady Worldwide, Inc.

(Continued)

*Primary Examiner* — Eric Keasel
(74) *Attorney, Agent, or Firm* — Quarles & Brady LLP (57) ABSTRACT

A valve lockout device includes a body having a mount portion that defines a passageway. A cover positioned adjacent to the body defines a cover portion adjacent the mount portion thereby inhibiting access to the passageway in the mount portion. A position control arm extends through at least one of the body and cover, the position control arm defines a valve engagement portion and an adjustment portion. A lock aperture is formed in at least the other of the body and cover through which the position control arm extends. An adjustment member is positioned adjacent at least one of the body and the cover, the adjustment member defines an adjustment member aperture aligned with the lock aperture and is configured to engage the adjustment portion of the position control arm. Coupling the lock aperture and the adjustment member aperture inhibits relative movement of the body, cover, and adjustment member.

15 Claims, 10 Drawing Sheets

(56) References Cited

U.S. PATENT DOCUMENTS

| | | | |
|---|---|---|---|
| D273,932 S | 5/1984 | Gates | |
| 4,498,320 A | 2/1985 | Mullis | |
| 4,513,773 A | 4/1985 | Hardiman, Jr. | |
| D296,414 S | 6/1988 | DeWalch | |
| 4,770,451 A | 9/1988 | Souza | |
| 4,971,289 A | 11/1990 | Pietras | |
| 5,014,528 A | 5/1991 | Roberts | |
| 5,052,655 A | 10/1991 | Ackroyd | |
| 5,115,834 A | 5/1992 | Champagne | |
| 5,116,018 A * | 5/1992 | Friemoth | F16K 35/06 251/110 |
| 5,165,263 A | 11/1992 | Perron et al. | |
| 5,207,595 A | 5/1993 | Learmont et al. | |
| 5,222,382 A | 6/1993 | De Vizzi | |
| D344,441 S | 2/1994 | Mahaney | |
| 5,299,597 A | 4/1994 | Fort et al. | |
| 5,348,206 A | 6/1994 | Chen | |
| 5,323,805 A | 6/1994 | Scaramucci | |
| D352,821 S | 11/1994 | Stillwagon | |
| 5,365,759 A | 11/1994 | Bonomi | |
| 5,368,066 A | 11/1994 | Scaramucci | |
| 5,411,048 A | 5/1995 | Massey | |
| 5,415,017 A | 5/1995 | Benda et al. | |
| 5,427,135 A | 6/1995 | Kieper | |
| 5,447,135 A | 9/1995 | Norkus | |
| 5,579,804 A | 12/1996 | Roberts | |
| 5,598,724 A | 2/1997 | Primeau | |
| 5,709,112 A | 1/1998 | Kennedy | |
| 5,806,555 A | 9/1998 | Magno, Jr. | |
| 5,823,027 A | 10/1998 | Glick et al. | |
| D419,054 S | 1/2000 | Curwood | |
| 6,119,494 A | 9/2000 | Whitfield | |
| 6,148,851 A | 11/2000 | Friedline et al. | |
| 6,260,819 B1 | 7/2001 | Ovsepyan | |
| D479,975 S | 9/2003 | Winocoor | |
| 6,622,536 B1 | 9/2003 | Fuller et al. | |
| D487,013 S | 2/2004 | Jenks | |
| 6,959,909 B2 | 11/2005 | Bancroft et al. | |
| 6,981,443 B2 | 1/2006 | Tillaart | |
| 7,044,148 B2 | 5/2006 | Berger et al. | |
| 7,114,698 B2 | 10/2006 | Espinoza | |
| 7,117,884 B2 | 10/2006 | Shuter | |
| D540,151 S | 4/2007 | Ebersole | |
| 7,207,198 B2 | 4/2007 | Benda | |
| 7,500,701 B2 | 3/2009 | Lalancette et al. | |
| 7,581,420 B2 | 9/2009 | Manthe et al. | |
| 7,588,050 B1 | 9/2009 | Russell | |
| D609,551 S | 2/2010 | Gibbs | |
| 7,731,153 B2 | 6/2010 | Miklo et al. | |
| 7,930,913 B2 | 4/2011 | Meyer et al. | |
| D637,891 S | 5/2011 | Chikiri | |
| 7,961,099 B2 | 6/2011 | Rendon et al. | |
| 7,980,201 B2 | 7/2011 | Muelken | |
| D647,781 S | 11/2011 | Tejszerski et al. | |
| D665,244 S | 8/2012 | Weinerman et al. | |
| 8,997,779 B2 * | 4/2015 | Rohde | F16K 35/06 137/383 |
| 2005/0092367 A1 | 5/2005 | Espinoza | |
| 2009/0266119 A1 | 10/2009 | Brojanac et al. | |
| 2010/0108921 A1 | 5/2010 | Milbeck et al. | |
| 2014/0034153 A1 * | 2/2014 | Grade | F16K 35/10 137/385 |

OTHER PUBLICATIONS

PCT International Search Report and Written Opinion, PCT/US2013/052898, Nov. 11, 2013.

PCT International Preliminary Report on Patentability, PCT/US2013/052898, Feb. 3, 2015.

* cited by examiner

VALVE LOCKOUT DEVICE

CROSS REFERENCES TO RELATED APPLICATIONS

This application is a continuation-in-part of U.S. patent application Ser. No. 13/566,131, filed Aug. 3, 2012, which is hereby incorporated herein by reference in its entirety.

BACKGROUND OF THE INVENTION

The present invention relates to valve lockout devices, and more particularly to a valve lockout device that is capable of being coupled to a mount and adjusted to accommodate a variety of valve configurations.

Valve lockout devices are used to prevent changing the state of a valve, such as between a closed position and an opened position. For instance, a valve lockout device may be used to lock a valve in a fully closed position while a technician performs repair or maintenance on a component (e.g., a turbine) that is downstream of the locked-out valve. The valve lockout device provides a visual and a structural impediment to altering the state of the valve by, for instance, blocking access to the control handle of a valve or structurally restricting the physical movement of the control handle.

One problem with existing valve lockout devices is that the lockout devices cannot be affixed to a position adjacent a valve and re-used when it is necessary to lockout a valve or other device. In typical prior art devices, it is necessary to install a lockout device adjacent a valve each time it is needed. Lockout procedures, therefore, can be time consuming and inefficient.

Prior art devices are often designed for a single type of valve. Designing a robust valve lockout device is challenging when the valve lockout device is required to alternately engage and effectively lockout more than one size and/or type of valve. For example, a three inch ball valve having a rectangular bar valve handle establishes distinct design requirements when compared to a six inch butterfly valve having a circular handwheel—a single valve lockout device is unlikely to provide an adequate solution to such unique styles of valves.

In light of at least the above, a need exists for a valve lockout device that is capable of being affixed adjacent a valve for re-use, and that is capable of adjusting to and locking out a variety of valve configurations.

SUMMARY OF THE INVENTION

In one aspect, a valve lockout device comprises a body having a mount portion that defines a passageway through the body and a body lock portion that extends from the mount portion and defines a body aperture. A cover positioned adjacent to the body defines a cover portion and a cover lock portion that extends from the cover portion and defines a cover aperture. A position control arm extends through at least one of the body and the cover, the position control arm defines a valve engagement portion and an adjustment portion. An adjustment member is positioned adjacent to at least one of the body and the cover, the adjustment member defines an adjustment member aperture and is configured to engage the adjustment portion of the position control arm. When the body aperture and the cover aperture are aligned, the cover portion is adjacent to the mount portion thereby inhibiting access to the passageway in the mount portion. When the body aperture, the cover aperture, and the adjustment member aperture are aligned, a clasp can be inserted in the body aperture, the cover aperture, and the adjustment member aperture to inhibit relative movement of the body, the cover, and the adjustment member.

In another aspect, a valve lockout device comprises a body having a mount portion that defines a passageway through the body and a body lock portion that extends from the mount portion. A cover positioned adjacent to the body defines a cover portion and a cover lock portion that extends from the cover portion. A position control arm extends through at least one of the body and the cover, the position control arm defines a valve engagement portion and an adjustment portion. A lock aperture is formed in at least the other of the body and the cover through which the position control arm extends. An adjustment member is positioned adjacent to at least one of the body and the cover, the adjustment member defines an adjustment member aperture and is configured to engage the adjustment portion of the position control arm. When the lock aperture and the adjustment member aperture are aligned, the cover portion is adjacent to the mount portion thereby inhibiting access to the passageway in the mount portion, and a clasp can be inserted in the lock aperture and the adjustment member aperture to inhibit relative movement of the body, the cover, and the adjustment member.

In a further aspect, a valve lockout device comprises a body having a mount portion that defines a passageway through the body and a body lock portion that extends from the mount portion and includes a body aperture that is transverse to the passageway. A cover that is slidably coupled to the body defines a cover portion and a cover lock portion that extends from the cover portion. The cover lock portion includes a hole and a cover aperture that is parallel to the body aperture. A position control arm extends through the hole in the cover. The position control arm defines a valve engagement portion and a threaded adjustment portion. An adjustment member is positioned adjacent to at least one of the body and the cover. The adjustment member defines an adjustment member aperture and a threaded portion that is configured to engage the threaded adjustment portion of the position control arm, such that rotation of the adjustment member axially translates the position control arm. When the body aperture and the cover aperture are aligned, the cover portion is adjacent to the mount portion thereby inhibiting access to the passageway in the mount portion. When the body aperture, the cover aperture, and the adjustment member aperture are aligned, a clasp can be inserted in the body aperture, the cover aperture, and the adjustment member aperture to inhibit relative sliding movement of the body and the cover, and rotation of the adjustment member relative to the body and the cover.

In yet another aspect, a valve lockout device comprises a body having a mount portion that defines a passageway through the body. A cover positioned adjacent to the body defines a cover portion adjacent to the mount portion thereby inhibiting access to the passageway in the mount portion. A position control arm extends through at least one of the body and the cover. The position control arm defines a valve engagement portion and an adjustment portion. A lock aperture is formed in at least the other of the body and the cover through which the position control arm extends. An adjustment member is positioned adjacent to at least one of the body and the cover. The adjustment member defines an adjustment member aperture that is aligned with the lock aperture and is configured to engage the adjustment portion of the position control arm. Coupling the lock aperture and the adjustment member aperture inhibits relative movement of the body, the cover, and the adjustment member.

In another aspect, the present disclosure provides a valve lockout device comprising a body, a cover, a position control arm, and an adjustment member. The body includes a hollow mount portion including a passageway through the body and a body lock portion that extends from the mount portion. The hollow mount portion is sized and dimensioned to receive a mounting device for mounting the body to a stationary member adjacent a valve. The body lock portion includes a body clasp aperture. The cover is sized and dimensioned to be received on the body and is moveable between at least an open and a closed position. The cover includes a passageway cover portion sized and dimensioned to enclose at least a portion of the passageway to limit access to the passageway in the closed position, and a cover lock portion that is sized and dimensioned to be received on the body, and that extends from the passageway cover portion. The cover lock portion includes a cover clasp aperture. The position control arm can be coupled to at least one of the body and the cover for engagement with a valve control. The adjustment member is coupled to the position control arm, and is configured to adjust the position of the position control arm to engage and inhibit movement of a valve control. The adjustment member also comprises an adjustment member clasp aperture. When the cover is slid into a position where the body clasp aperture and the cover clasp aperture are aligned, the cover passageway portion is adjacent to and inhibits access to the passageway in the mount portion. When the body aperture, the cover aperture, and the adjustment member aperture are aligned, a clasp is insertable through the body clasp aperture, the cover clasp aperture, and the adjustment member clasp aperture to receive a clasp through the aligned apertures that is securable to inhibit relative movement of the body, the cover, and the adjustment member, and to inhibit movement of the position control member.

In still another aspect, a valve lockout device is provided that comprises a body, a cover, a valve position control arm, and an adjustment member. The body is configured to be coupled to a stationary member adjacent a valve, and includes a mount portion having a hollow interior and a body lock portion comprising at least one body shackle aperture that extends from the mount portion. The hollow interior is sized and dimensioned to receive an attachment device for mounting the body to the stationary member. The cover is positioned adjacent to the body, and includes a cover mount portion and a cover lock portion extending from an upper surface of the cover mount portion. The cover lock portion comprises a cover shackle aperture. A valve position control arm is coupled to and extends through at least one of the body and the cover, and includes a U-shaped end adapted to engage a portion of a valve to inhibit adjustment of the valve. A shackle aperture is formed in at least the other of the body and the cover through which the position control arm extends. The adjustment member is rotatably coupled to the valve position control arm and adapted to position the U-shaped end, and comprises a plurality of adjustment member shackle apertures. When the adjustment member is rotated to engage the U-shaped end to a valve, one of the plurality of adjustment member apertures aligns with the cover shackle aperture and the body shackle aperture, and when a clasp of a lock is received in the aligned apertures, at least a portion of the cover mount portion is aligned adjacent an opening to the hollow interior, thereby inhibiting access to the hollow interior, and the clasp can inhibit relative movement of the body, the cover, and the adjustment member.

These and still other aspects will be apparent from the description that follows. In the detailed description, preferred exemplary embodiments will be described with reference to the accompanying drawings. These embodiments do not represent the full scope of the concept; rather the concept may be employed in other embodiments. Reference should therefore be made to the claims herein for interpreting the breadth of the invention.

DETAILED DESCRIPTION OF THE DISCLOSED EMBODIMENTS

Referring now to the Figures, and first to FIGS. 1-6C, a first embodiment of an exemplary lockout 10 that is adaptable to various types of mounts and valves is shown. The lockout device 10 is affixed to a stationary member adjacent a valve, and engages the valve handle to prevent movement, and therefore to lock the valve handle into a predetermined position. In the embodiment shown here, the lockout device 10 generally includes a base 18, cover 46, and a position control arm 102. The base 18 is affixed to the stationary member, which is shown here as a conduit or pipe, adjacent the valve 14. A mounting device, here a hose clamp illustrated as mount 12, includes a coupling element that extends through a lower portion of the base 18, and couples the base 18 to the stationary member. The cover 46 is slidably received on the base 18 to inhibit or prevent access to the coupling element, and therefore to prevent removal from the stationary member. The position control arm 102 extends through apertures in both the base 18 and the cover 46, engages a handle 16 of the valve 14, and is locked in position when a clasp such as the shackle of a padlock is inserted into aligned holes, as described below, preventing movement of the valve handle 16.

Figure 1:
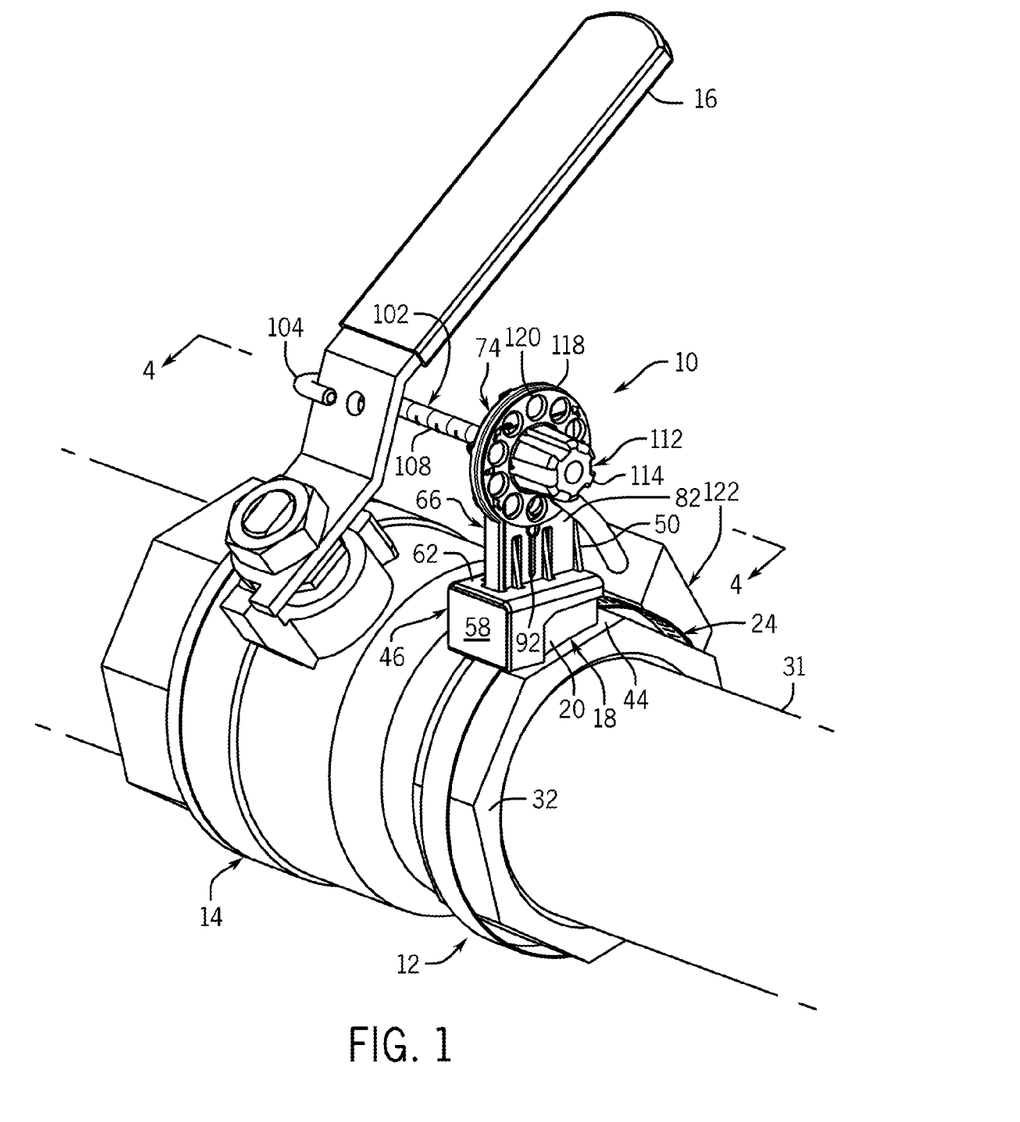
FIG. 1 is an isometric view of an exemplary valve lockout device installed in connection with an exemplary ball valve.
Figure 4:
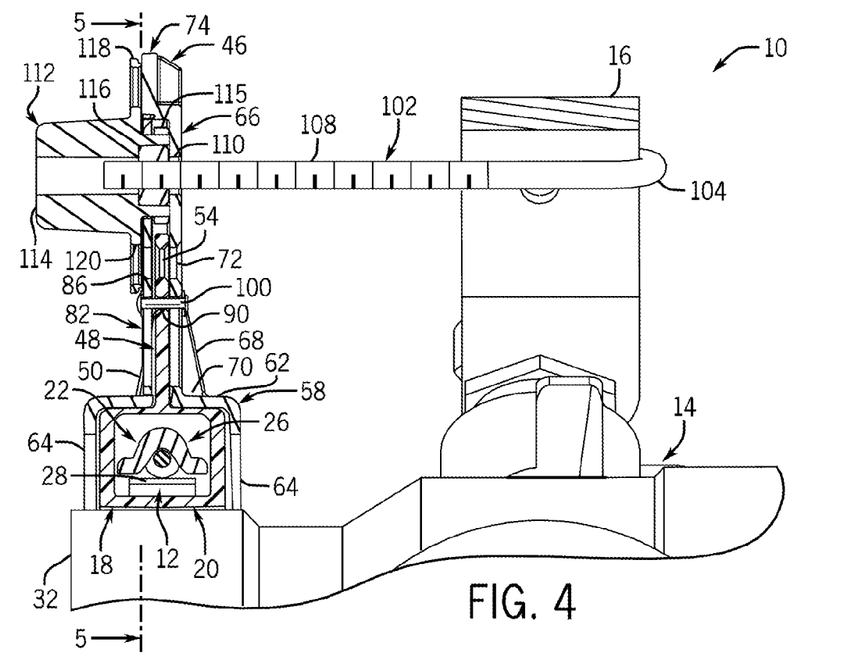
FIG. 4 is a partial section view along line 4-4 shown in FIG. 1.
Figure 5:
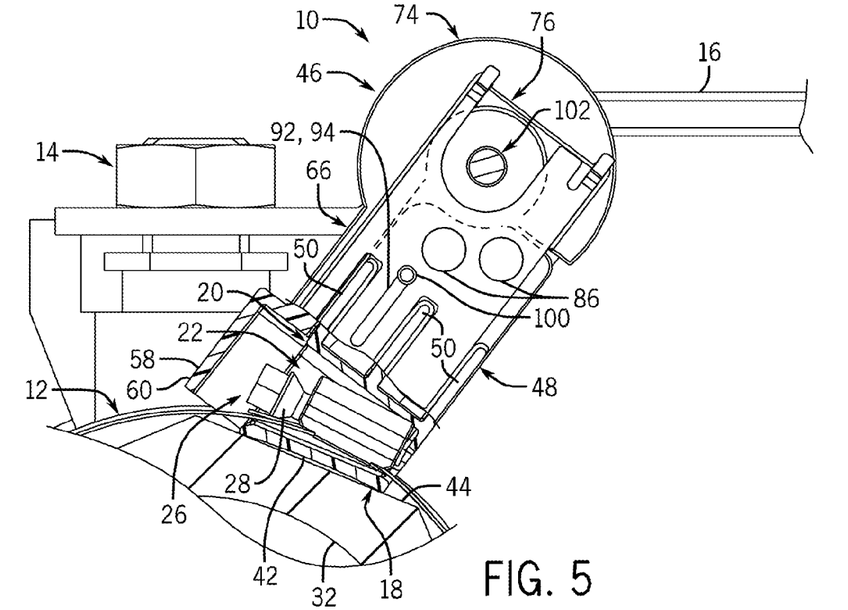
FIG. 5 is a partial section view generally cut away along line 5-5 shown in FIG. 4 with portions of the exemplary valve lockout device removed for clarity.

Referring now particularly to FIGS. 1, 4, and 5, the lockout device 10 is shown coupled to an exemplary mount 12, which is, as described above, illustrated as a standard hose clamp connected to a conduit 31 adjacent a ball valve 14. Also as described above, the lockout device 10 includes a position control arm 102 that here includes a u-shaped engagement portion 104 that is coupled to the handle 16 of the ball valve 14 to restrict movement of the valve handle 16. In general, the lockout 10 is secured to the conduit through the mount 12 and engages the valve handle 16 to prevent counterclockwise rotation of the valve handle 16 (as viewed in FIG. 1), which would alter the state of the ball valve 14 from the off position (shown in FIG. 1) to the on position.

Figures 2, 3:
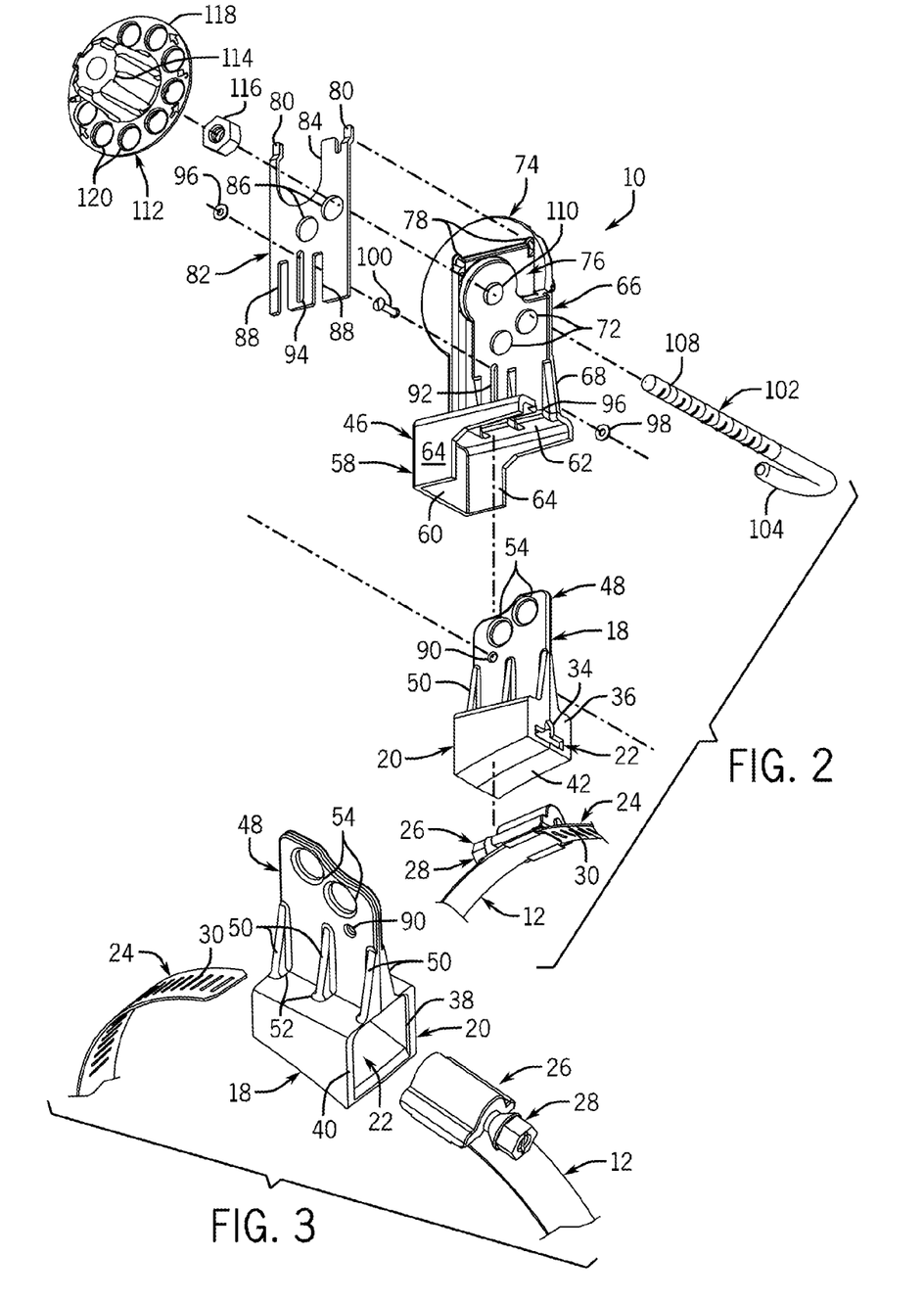
FIG. 2 is an exploded, isometric view of the exemplary valve lockout device and an exemplary mount.
FIG. 3 is an isometric view of an exemplary body uncoupled from the exemplary mount.

With additional reference to FIGS. 2 and 3 the components of the lockout device 10 are shown in relation to the exemplary hose-clamp mount 12. As described above, the lockout 10 includes an affixed body 18 that is coupled to a stationary member, here a conduit 31, adjacent to valve 14, and that is further coupled to the mount 12 which is coupled to the conduit in a secure manner as described below. Specifically, the affixed body 18 includes a lower mount portion 20 with a hollow interior 23 which provides a passageway through the body 18. The mount 12 extends through the passageway 22, and a mount retaining and adjustment mechanism 26 is received and housed in the hollow interior 23. In the exemplary embodiment, the mount 12 includes a slotted portion 24 that is engaged by the mount adjustment mechanism 26. In typical fashion, the mount adjustment mechanism 26 includes a worm screw 28 that engages slots 30 in the slotted portion 24. Rotation of the worm screw 28 results in translation of the slotted portion 24 relative to the mount adjustment mechanism 26, which can result in the mount 12 being coupled to a conduit 31 or a collar 32 of the ball valve 14 (shown in FIG. 1). As understood by one of ordinary skill in the art, the mount 12 may comprise a variety of structures, and need not be a circular band. In some forms, the mount 12 may be a valve clamp, a valve band, a mounting pad, or any other structure that can be (or is integrally) secured to a valve or to a conduit, and that includes some form of securement (e.g., a screw-worm gear configuration, a nut-bolt arrangement, a clasp, etc.) that can be housed within the hollow interior 23 of the passageway 22 of the body 18 to ultimately prevent removal of the mount 12.

The passageway 22 in the exemplary mount portion 20 of the body 18 is configured to receive the slotted portion 24 and to house the mount adjustment mechanism 26 of the exemplary mount 12. As best shown in FIGS. 2 and 3, the slotted portion 24 can be inserted through a slot, such as a keyway 34 formed in an end face 36 of the mount portion 20. Similarly, the mount adjustment mechanism 26 can be inserted through a rectangular opening 38 formed in an opposite end face 40 of the mount portion 20. An exterior, inward-facing surface 42 of the mount portion 20 is illustrated as being arcuate to better contour to a curved mounting surface (e.g., the conduit 31), although the surface 42 may be substantially flat to engage a mating flat surface 44 of the collar 32 (e.g., shown in FIG. 5), or constructed in a v-shape, as described below.

Figure 6A:
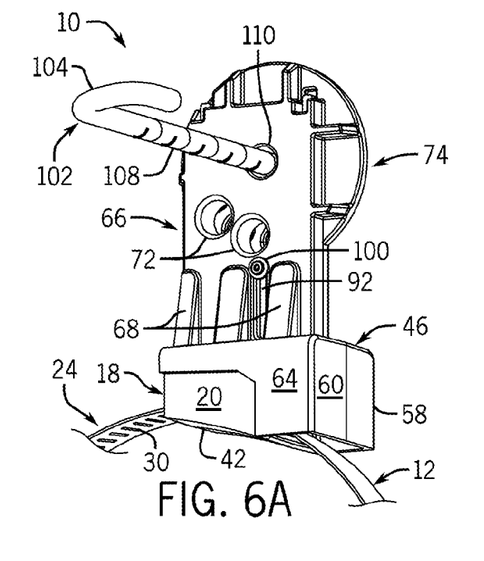
FIG. 6A is a rear isometric view of the exemplary valve lockout device coupled to the exemplary mount.
Figure 6B:
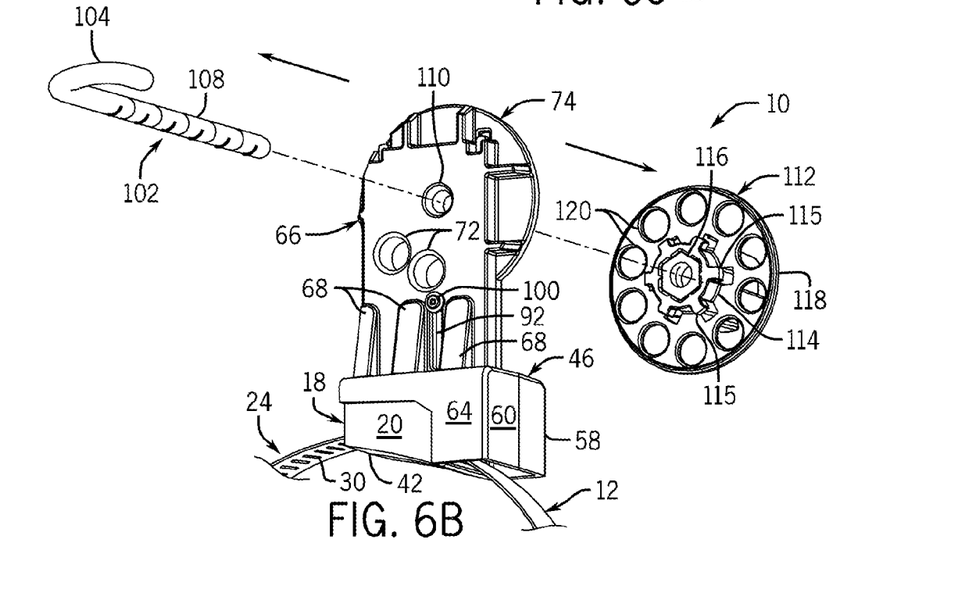
FIG. 6B is a rear isometric view similar to FIG. 6A showing an exemplary position control arm and an exemplary adjustment member uncoupled.
Figure 6C:
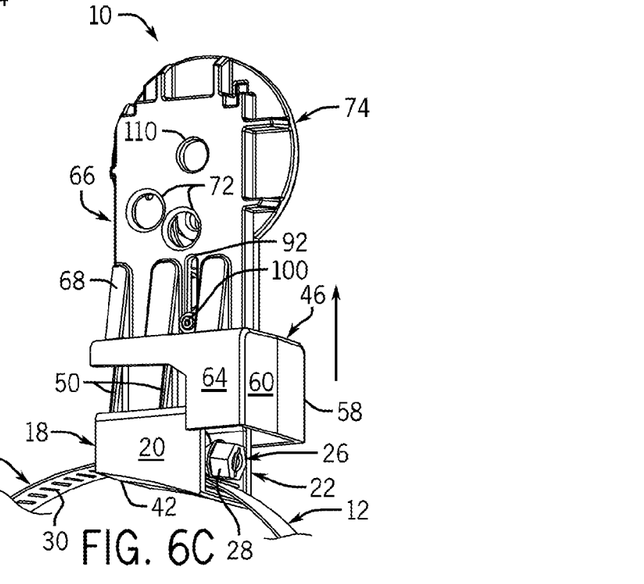
FIG. 6C is a rear isometric view similar to FIG. 6A showing an exemplary cover slid upward relative to the exemplary body.

The body 18 is configured to be slidably coupled with a cover 46 (e.g., in FIG. 6C the cover 46 is shown slid upward from the body 18). The relative movement between the body 18 and the cover 46 allows access to the mount adjustment mechanism 26, which is housed within the hollow interior 23 of the passageway 22 in the body 18, Access to the mount adjustment mechanism 26 can be selectively inhibited by sliding the cover 46 over the end of the passageway 22 to prevent access to and tampering with the lockout 10 during use. To facilitate the engagement between the body 18 and the cover 46, the body 18 includes a body lock portion 48 that extends upward from the mount portion 20. A series of positioning ribs 50 are generally perpendicular to the plane of the body lock portion 48 and taper into the body lock portion 48 from a base 52 formed in the mount portion 20. A pair of body shackle or clasp apertures 54 are formed through the body lock portion 48 and are positioned such that centers of the body shackle apertures 54 are circumferentially spaced along an imaginary circle, that is, the centers of the body shackle apertures 54 are substantially equal distance from a common center point. The body shackle apertures 54 are oriented generally transverse to the longitudinal axis of the passageway 22. The body lock portion 48 further defines an arcuate upper end 56 that also has a radius of curvature emanating from the same common center point as the body shackle apertures 54.

With continued reference to FIG. 2 and additional reference to FIGS. 4 and 5, the mount 12 is secured to the collar 32 such that the mount adjustment mechanism 26 is housed within the passageway 22 formed in the body 18. The cover 46 is positioned adjacent to and slid downward over the body 18 to cover an opening to the hollow interior and to inhibit access to the mount adjustment mechanism 26, thus also inhibiting operational access to the mount adjustment mechanism 26 and removal of the body 18. Specifically, the cover 46 defines a cover portion 58 that partially blocks access to the opening 38 formed in the mount portion 20 of the body 18. The cover portion 58 is sized to enclose the opening 38 sufficiently to inhibit or prevent easy access to the worm screw 28 within the passageway 22, which inhibits loosening and removal of the mount 12. The cover portion 58 includes an end wall 60 bridging a top wall 62 and side walls 64. A cover lock portion 66 extends upward from the cover portion 58 and includes a series of strengthening ribs 68 that are generally perpendicular to the plane of the cover lock portion 66 and that taper into the cover lock portion 66 from a base 70 formed with the top wall 62 of the cover portion 58. The strengthening ribs 68 are also sized to accommodate several of the positioning ribs 50 when the cover 46 is slid onto the body 18. A pair of cover shackle or clasp apertures 72 are formed through the cover lock portion 66 and are positioned such that centers of the cover shackle apertures 72 are circumferentially spaced along an imaginary circle, that is, the centers of the cover shackle apertures 72 are substantially equal distance from a common center point. The imaginary circle of the cover shackle apertures 72 is coaxial with the imaginary circle of the body shackle apertures 54 when the cover 46 is fully seated onto the body 18, such that the body shackle apertures 54 are coaxial with the respective cover shackle apertures 72. Furthermore, in the exemplary embodiment, the cover shackle apertures 72 and the body shackle apertures 54 are generally formed in parallel offset planes.

The cover lock portion 66 also includes a disc-shaped portion 74 and a rectangular recess 76 intersecting the disc-shaped portion 74. The upper corners of the recess 76 define pockets 78 into which mating bent tabs 80 of a plate 82 are positioned. The form factor of the recess 76 is configured to generally match the outer envelope of the plate 82, such that the plate 82 is securely seated into the recess 76. The plate 82 further includes a U-shaped cutout 84 and a pair of plate shackle apertures 86 that are aligned with the cover shackle apertures 72. Parallel notches 88 are formed in the plate 82 to provide clearance for the positioning ribs 50 of the body 18.

The plate 82 is inserted into the recess 76 to provide additional robustness and resistance to tampering with the lockout 10. However, in some applications, the plate 82 may not be necessary or may be integral with the cover 46 (e.g., by overmolding a cover to a metallic plate).

When assembled, the cover 46 and the plate 82 can be slid relative to the body 18. Specifically, the body 18 includes a rivet opening 90 formed through the body lock portion 48, the cover 46 includes a vertical slot 92 formed in the cover lock portion 66, and the plate 82 includes another vertical slot 94. The body lock portion 48 is inserted into a groove 96 in the top wall 62 of the cover lock portion 66 as the cover 46 is slid over the body 18. When the cover 46 is fully seated on the body 18, the vertical slots 92, 94 of the cover 46 and the plate 82, respectively, flank the rivet opening 90. A pair of washers 98 and a rivet 100 are then secured in the vertical slots 92, 94 and the rivet opening 90 to slidably capture the cover 46 and the plate 82 to the body 18. Once coupled, the cover 46 and the plate 82 can be moved up and down vertically relative to the body 18 as the rivet 100 rides in the slots 92, 94 between ends of the slots 92, 94.

With the body 18, the cover 46, and the plate 82 secured to the mount 12, the position control arm 102 can be engaged with the valve handle 16 and coupled to the balance of the lockout 10. Specifically, the exemplary position control arm 102 includes a curved, U-shaped valve engagement portion 104 that is configured to securely capture the valve handle 16. Given the benefit of this disclosure, one skilled in the art will appreciate the various valve engagement portion configurations that are suitable to engage and restrain a valve handle. For example, in other forms, a valve engagement portion may completely cover or encapsulate a valve handle. An opposite end of the position control arm 102 defines an adjustment portion 108, which is threaded in the exemplary embodiment. The adjustment portion 108 is inserted through a hole 110 formed in the cover lock portion 66 of the cover 46, extends adjacent to the arcuate upper end 56 of the body 18, and through the U-shaped cutout 84 in the plate 82. While the position control arm 102 is shown as engaging the cover 46, the position control arm 102 may alternatively engage the body 18 or the plate 82, or some combination of the body 18, the cover 46, and the plate 82.

The relative location of the position control arm 102 is controlled by an adjustment member 112. The adjustment member 112 is positioned adjacent to the plate 82 and the disc-shaped portion 74 of the cover lock portion 66. The adjustment member 112 includes a central barrel 114 into which a nut 116 is secured (e.g., press-fit), such that the nut 116 rotates in unison with the adjustment member 112. A series of circumferentially spaced fingers 115 extend radially outward from the central barrel 114 (best shown in FIGS. 4 and 6B) to axially capture the adjustment member 112 to the plate 82, such that the barrel 114 bears against the U-shaped cutout 84 during relative rotation of the adjustment member 112. A radial flange 118 extends from the central barrel 114 and defines a series of circumferentially-spaced adjustment member apertures 120. In use, the threaded adjustment portion 108 is engaged with the nut 116 of the adjustment member 112 such that rotating the adjustment member 112 rotates the nested nut 116, thereby axially translating the position control arm 102 toward and away from the cover 46 depending on the rotational direction of the adjustment member 112. As the position control arm 102 translates toward the cover 46, the valve engagement portion 104 will abut and restrain movement of the valve handle 16 (e.g., as shown in FIGS. 1 and 4). Given the benefit of this disclosure, one skilled in the art will appreciate that alternative forms of restrained engagement between the position control arm 102 and the adjustment member 112 are possible. For instance, the engagement may incorporate a series of axially spaced ramps on a position control arm that engage a hinged pawl within an adjustment member, such that when the pawl is aligned with the successive of ramps, the position control arm can only be translated toward the body adjustment member. Rotating the adjustment member will offset the pawl and the ramps such that the position control arm can be removed from the adjustment member.

In the embodiment shown here, the lockout 10 is engaged with the valve handle 16 by first sliding the cover 46 downward over the body 18 to align the cover shackle apertures 72 and the plate shackle apertures 86 with the body shackle apertures 54. The adjustment member 112 is rotated to securely engage the position control arm 102 with the valve handle 16 while simultaneously aligning at least one of the adjustment member apertures 120 with the aligned plate shackle apertures 86, the body shackle apertures 54, and the cover shackle apertures 72. A clasp, such as the shackle of a padlock 122 (shown in FIG. 1) is then inserted into at least one aligned shackle aperture in the cover 46, the plate 82, the body 18, and the adjustment member 112 to prevent relative rotational movement of the adjustment member 112, which, if allowed, would enable uncoupling the valve engagement portion 104 from the valve handle 16, and movement of the valve handle 16. The engagement of the clasp or shackle of padlock 122 in the aligned apertures also prevents relative sliding between the body 18, the cover 46, and the plate 82, which inhibits access to the mount adjustment mechanism 26 that is secured beneath the cover portion 58 of the cover 46 and within the passageway 22 of the body 18. The padlock 122 can be a keyed or combination lock. Although a padlock 122 is shown, the clasp can comprise various devices, such as a straight bar, a shackle, a plastic cable tie, and the like, but is preferably sized to prevent any substantial relative movement between the various components of the lockout 10.

With specific reference to FIGS. 6A-6C (showing only the lockout 10), the lockout 10 is removed by first removing the shackle of the padlock 122, which allows the adjustment member 112 to be rotated. Rotating the adjustment member 112 in the opposite direction as that used to draw the valve engagement portion 104 of the position control arm 102 toward the cover 46 will result in translating the valve engagement portion 104 axially away from the valve handle 16. In the example embodiment, the position control arm 102 and the adjustment member 112 need not be completely disconnected in order for the cover 46 and the plate 82 to be slid upward away from the mount portion 20 of the body 18 (e.g., shown in FIG. 6C). With the cover portion 58 spaced from the passageway 22, the mount adjustment mechanism 26 within the passageway 22 can be accessed to disengage the mount 12 from the body 18 (e.g., see FIG. 3).

The body 18, the cover 46, the plate 82, the position control arm 102, and the adjustment member 112 can be made of plastic, metal, composites, or any other suitable material to accommodate the particular application requirements. In preferred forms, the body 18 and the cover 46 are made of plastic, while the plate 82 and the position control arm 102 are made of metal, such as steel.

Referring now to FIGS. 7 through 15, a second embodiment of a lockout device 10 constructed in accordance with the present disclosure is shown. Here, corresponding elements having similar functions to those described above with respect to the first embodiment are given the same numbers. As described with reference to FIGS. 1-6c, above, the lockout device 10 of FIGS. 7-15 generally includes an affixed body 18 that is adapted to be coupled to a conduit 31 or the collar 32 of a ball valve 14 adjacent a handle 16 to selectively inhibit motion of the handle 16. The affixed body 18 includes a lower portion that defines a hollow interior 38 sized and dimensioned to receive an adjustment and locking mechanism 26 for affixing the base 18 to the conduit 31, as described above. A shackle support member or upper body lock portion 48 extends upward from the base. The shackle support member 48 supports a position control member 102 which limits motion of a valve handle 16, as described above with respect to the first embodiment. The support member 48 further at least are shackle aperture 54 that can be aligned with similar apertures 72 in the cover 46 to receive a shackle to inhibit movement of the position control member 102 and adjustment and locking mechanism 26.

Figure 7:
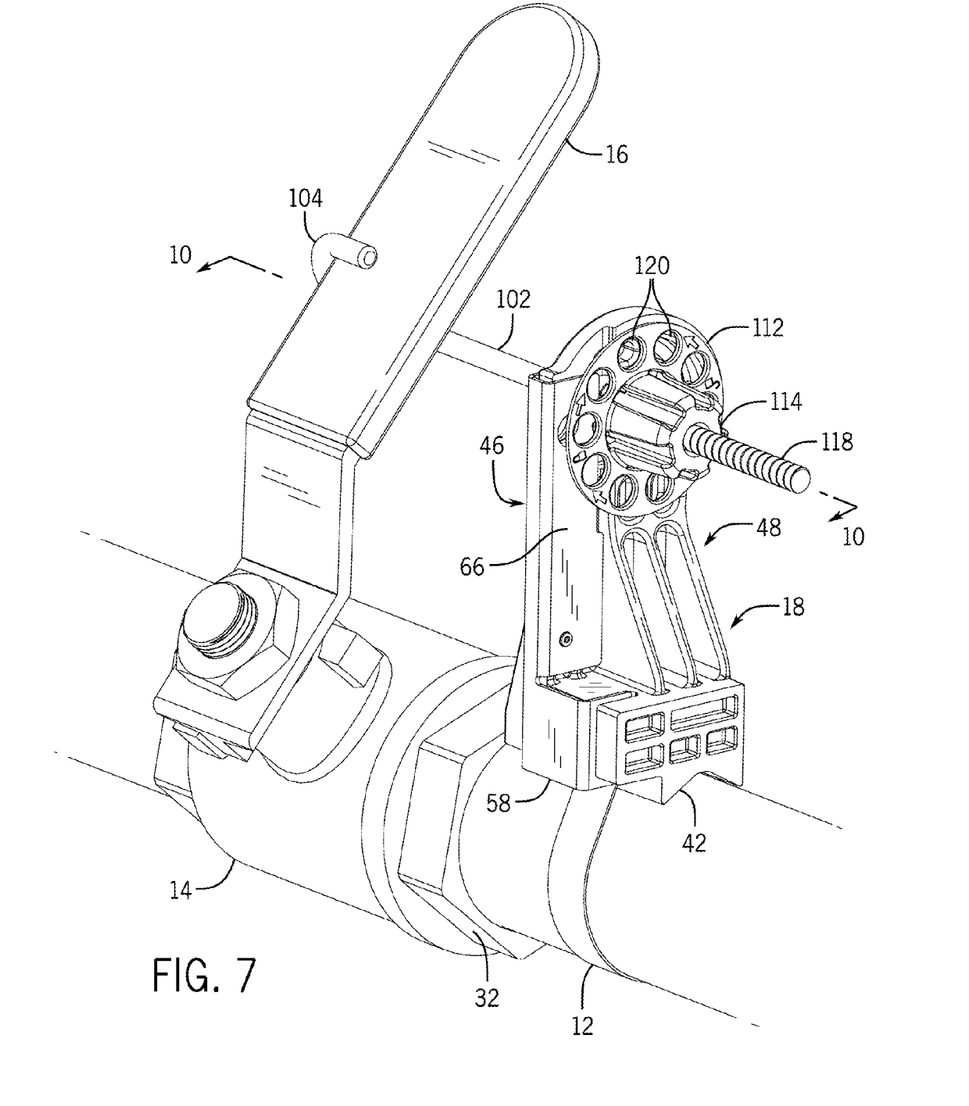
FIG. 7 is an isometric view of an exemplary valve lockout device installed in connection with an exemplary ball valve.

Referring now specifically to FIG. 7, in the second embodiment, the lockout device 10 comprises an affixed body 18 receiving a mount 12, such as an attachment member 26 and corresponding worm screw 28 coupled to a corresponding hose clamp, for coupling the locking device 10 to a conduit 31 or other component adjacent a valve here shown as a ball valve 14. The affixed body 18 includes a cover 46 that encloses an internal opening 38 (FIG. 9) receiving the attachment member for the valve mount 12 as described below, and an adjustment member 112. The adjustment member 112 is coupled to the position control arm 102 which includes a U-shaped valve engagement portion 104 as described above. The cover 46 can be slidably received on the body 18 and includes a lower U-shaped portion 58 that substantially encloses the opening 38 in the lower portion of the body 18 and an upper U-shaped lock cover portion 66 which covers a slot 93 formed in the body as described below. The lock cover portion 66 further includes a cover aperture 72 which can be aligned with an aperture 54 in the attached body 18 and one of a plurality of adjustment member apertures 120 in the adjustment member 112. Each of these components are described more fully below.

Figure 8:
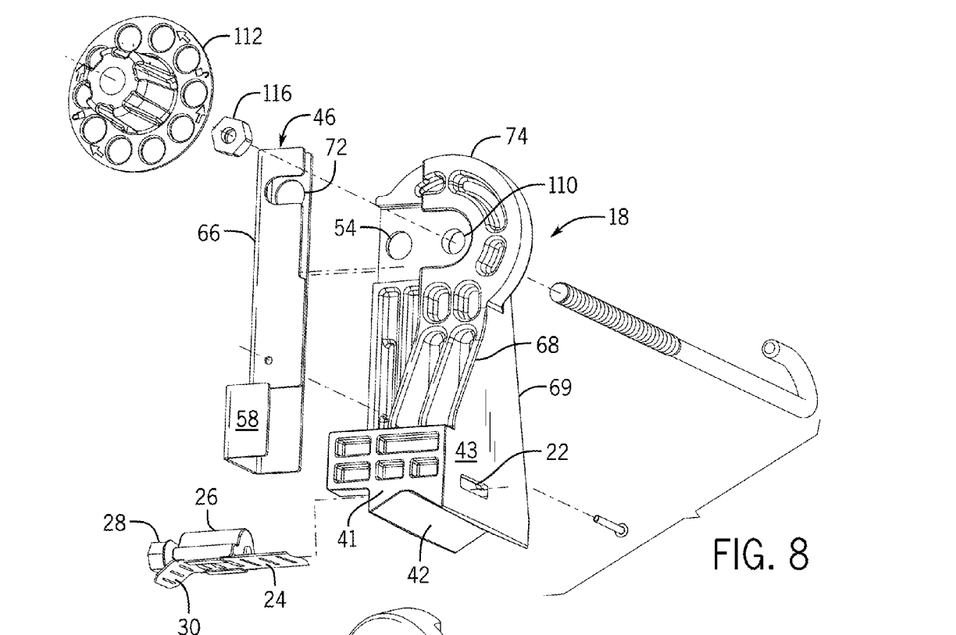
FIG. 8 is an exploded, isometric view of the exemplary valve lockout device and an exemplary mount.
Figure 9:
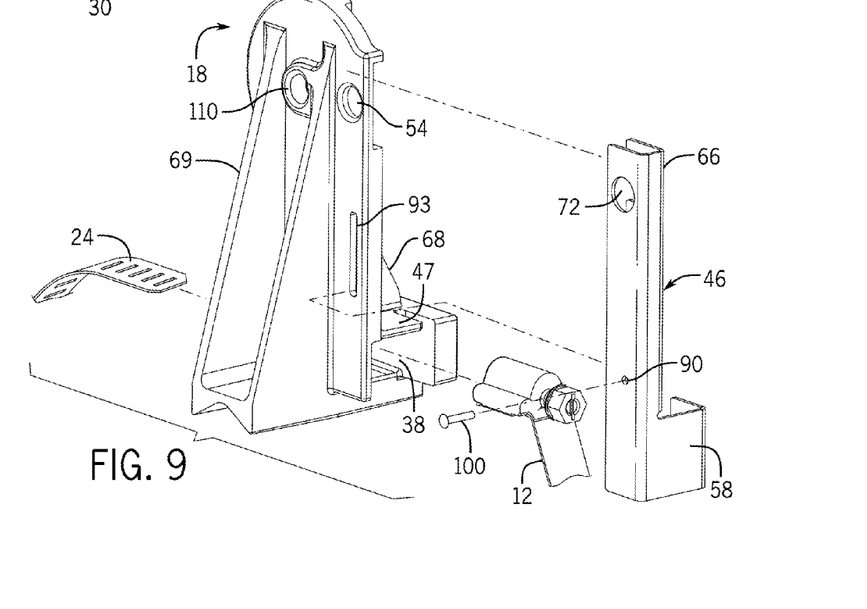
FIG. 9 is an isometric view of an exemplary body uncoupled from the exemplary mount.
Figure 10:
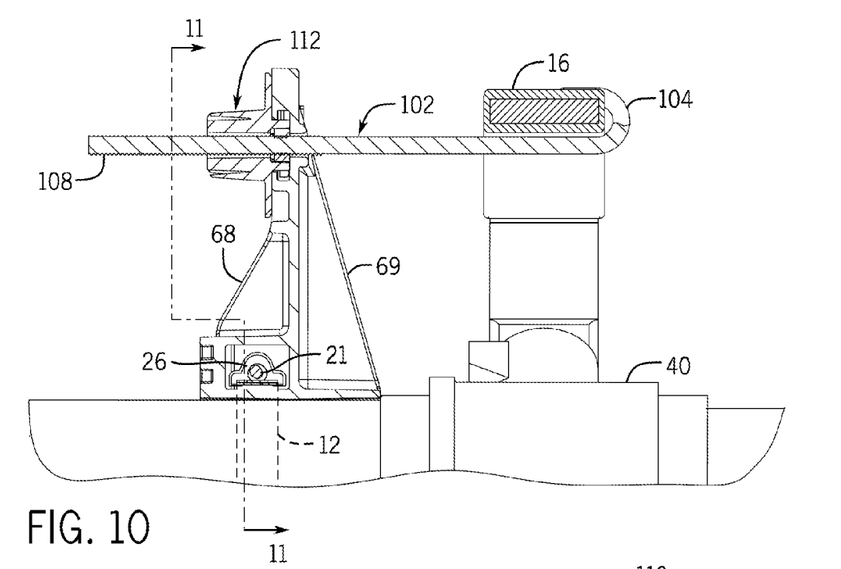
FIG. 10 is a partial section view along line 10-10 shown in FIG. 7.
Figure 11:
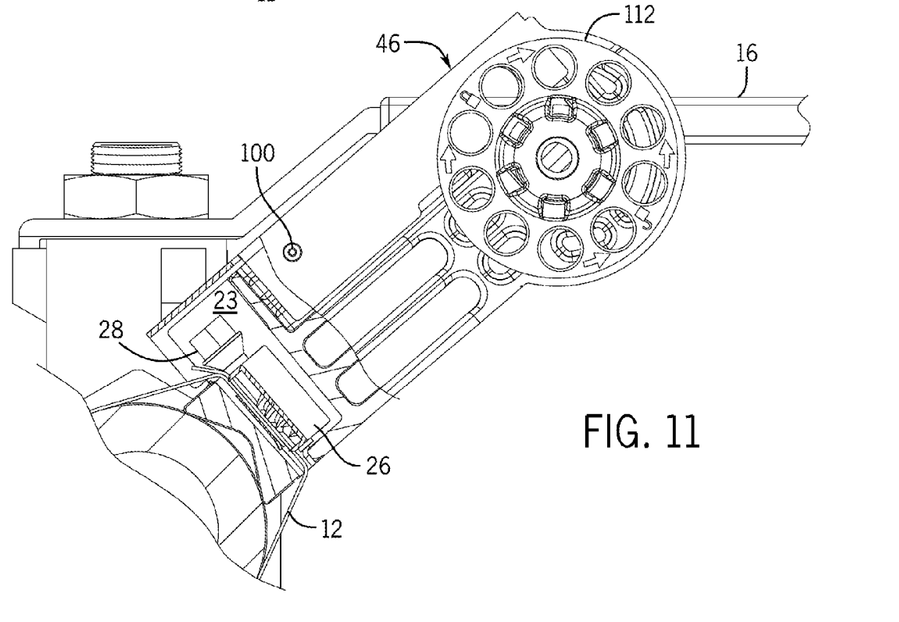
FIG. 11 is a partial section view generally cut away along line 11-11 shown in FIG. 10 with portions of the exemplary valve lockout device removed for clarity.
Figure 12:
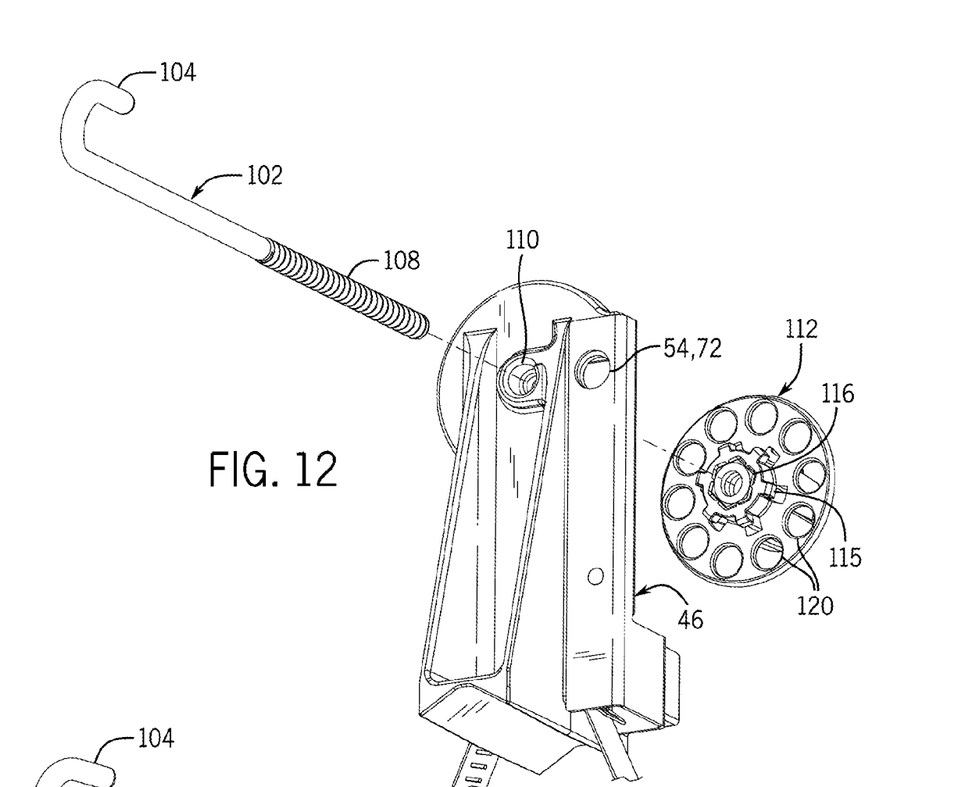
FIG. 12 is a rear isometric view of the exemplary valve lockout device coupled to the exemplary mount.
Figure 13:
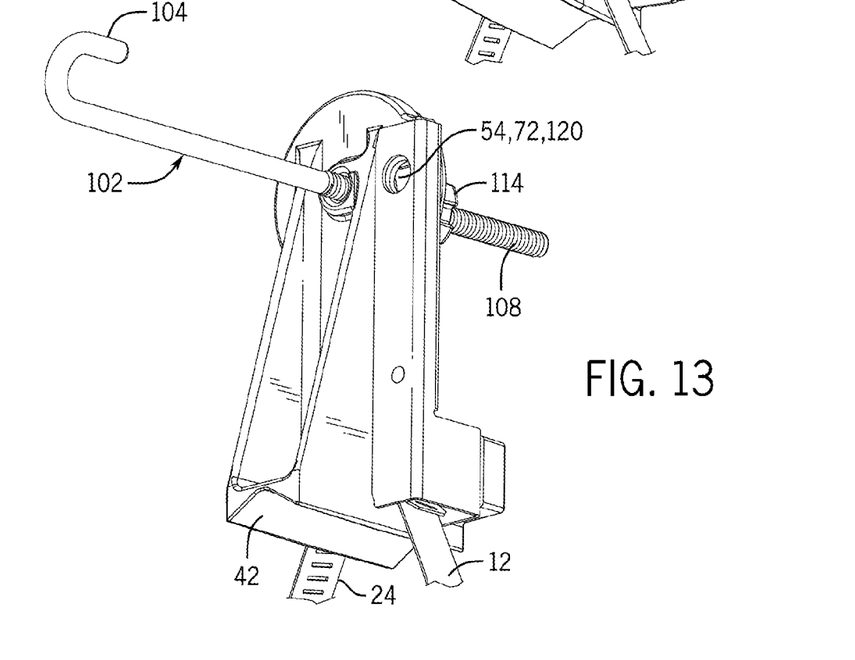
FIG. 13 is a rear isometric view similar to FIG. 12 showing an exemplary position control arm and an exemplary adjustment member uncoupled.

Referring now also to FIGS. 8 and 9, a front and rear exploded view of the second embodiment of a locking device 10 are shown. As described above, the lockout device 10 includes an affixed body 18 having a lower mount portion 20 with a hollow interior 38 that receives an attachment member 76 for coupling the affixed body 18 to a stationary member, and an upper body lock portion or shackle support member 48, supporting a position control arm 102, and an adjustment mechanism 112. The cover 46 is slidably received on the body 18 to limit access to the attached member 26 received in the mount portion 20, and aligned apertures 54, 72 are sized and dimensioned to receive a clasp or shackle of a padlock 172 to inhibit movement as discussed below with reference to FIG. 14.

Referring still to FIGS. 8 and 9, the affixed body 18 includes a lower surface 42 that can be v-shaped as shown to enable mounting on a round conduit as shown in FIG. 7, or a hexagonal or other ring 32. Although the lower surface here is shown as v-shaped, it can also be arcuate to match the radius curvature of an expected mounting device. In some applications, however, the surface could also be flat or concave depending on the selected mounting surface.

Referring still to FIGS. 8 and 9, the planar shackle support member or lock body member 48 extends upwards from the lower member portion 20 of the affixed body 18, culminating in a disc shaped portion 74 similar to that described above at the opposing distal end. The disc shaped portion 74 includes a center aperture 110 for receiving the position control arm 102 and a lockout body shackle aperture 54 which aligns with apertures in the cover 46 and adjustment mechanism 112 to enable a clasp or shackle to be extended through the aligned apertures, as described below.

Referring again to FIG. 8, the lower member portion 20 of the affixed body 18 is generally shown as a polyhedron in shape, and the outer surface defines a hollow valve mount adjustment opening 38 sized and dimensioned to receive a mount adjust mechanism 26 corresponding to the mount 12. The polyhedron surface includes a substantially rectangular lower portion comprising the lower surface 42, and an upper surface 47 offset a distance above the lower surface 42. A substantially planer front surface 41 extends from the upper surface 47 to the lower surface 42. The shackle support 48 extends from the lower surface 42 to the upper surface 47 to from an enclosed back portion. A plurality of triangular shaped ribs 68 extend between the upper surface 47 of the lower polyhedron region substantially to the disc shaped portion 74 to reinforce the shackle support or body lock portion 48. As shown here, one side of the triangle extends along the upper surface 47, a perpendicular second side extends along the shackle support 48, and the hypotenuse of the triangular portion extends between these two surfaces. The outermost rib 68 extends is contiguous with a side 43 of the polyhedron mount 20 that encloses one side of the valve mount adjustment opening 38. An aperture 22 or passageway sized and dimensioned to receive the valve mount strap is provided in the side 43, enabling a stop of a hose clamp to extend through the member portion 20.

Referring now to FIG. 9, the side of the lower portion polyhedron opposite the side 43 remains open, enabling insertion of the mount adjustment and locking mechanism 26 which, as described above, includes a worm screw 28 and is received on a slotted portion 24 of the mount 12, here illustrated as a hose clamp.

Referring still to FIG. 9, substantially triangular strengthening ribs 69 extend in a rearward direction substantially perpendicular to the body lock portion 48. The strengthening ribs 69 extend upward for lower surface 42 and toward the disc shaped portion 74, with one side of one triangular ribs 69 along the upper surface 42 of the lower mounting portion 20, and a second perpendicular side along the body lock portion 48, and a hypotenuse extending below the two. A slot 90 is provided through the body lock portion 48, positioned generally above the member portion 20, opposite the side 43, and generally aligned vertically with the shackle aperture 74. The slot 90 is sized and dimensioned to receive a rivet 100 for coupling the cover 46 to the lockout device 10 as described below.

Referring now to FIGS. 8, 9, 10, and 11, as assembled, a shop corresponding to the mount 12 extends through the valve mount adjustment opening 38 in the affixed body 18 and through the passageway or aperture 22 in the wall 43. The mount adjustment mechanism 26 is received in the valve mount adjustment opening 38, and the worm screw 28 is adjusted to lock the mount 12 and corresponding locking device 26 to a conduit 31, as is described above. The position control arm 102 extends through the aperture 110 centered in the disc shaped portion 74 and extends through the adjustment mechanism 112 and corresponding nut 116. The U-shaped valve engagement portion 104 of the position control arm 102 is engaged to the handle 16 of the ball valve 14. The adjustment member 112 and central barrel 114 are rotated to move the threaded adjustment portion 108 to bring the U-shaped valve adjustment portion 104 into contact with the valve handle 16. The cover 46 which includes an upper cover lock portion 66 and lower valve mount cover 58 is positioned over the side of the body 18 and aperture 72 in the cover 46 aligns with an aperture 54 in the base 18 and the adjustment mechanism 112 is rotated to bring one of the plurality of apertures 120 into alignment as well. A rivet 100 is received in an aperture 90 in the cover and the slot 93 in the base 18 to retain the cover 46 on the base 18.

Figure 14:
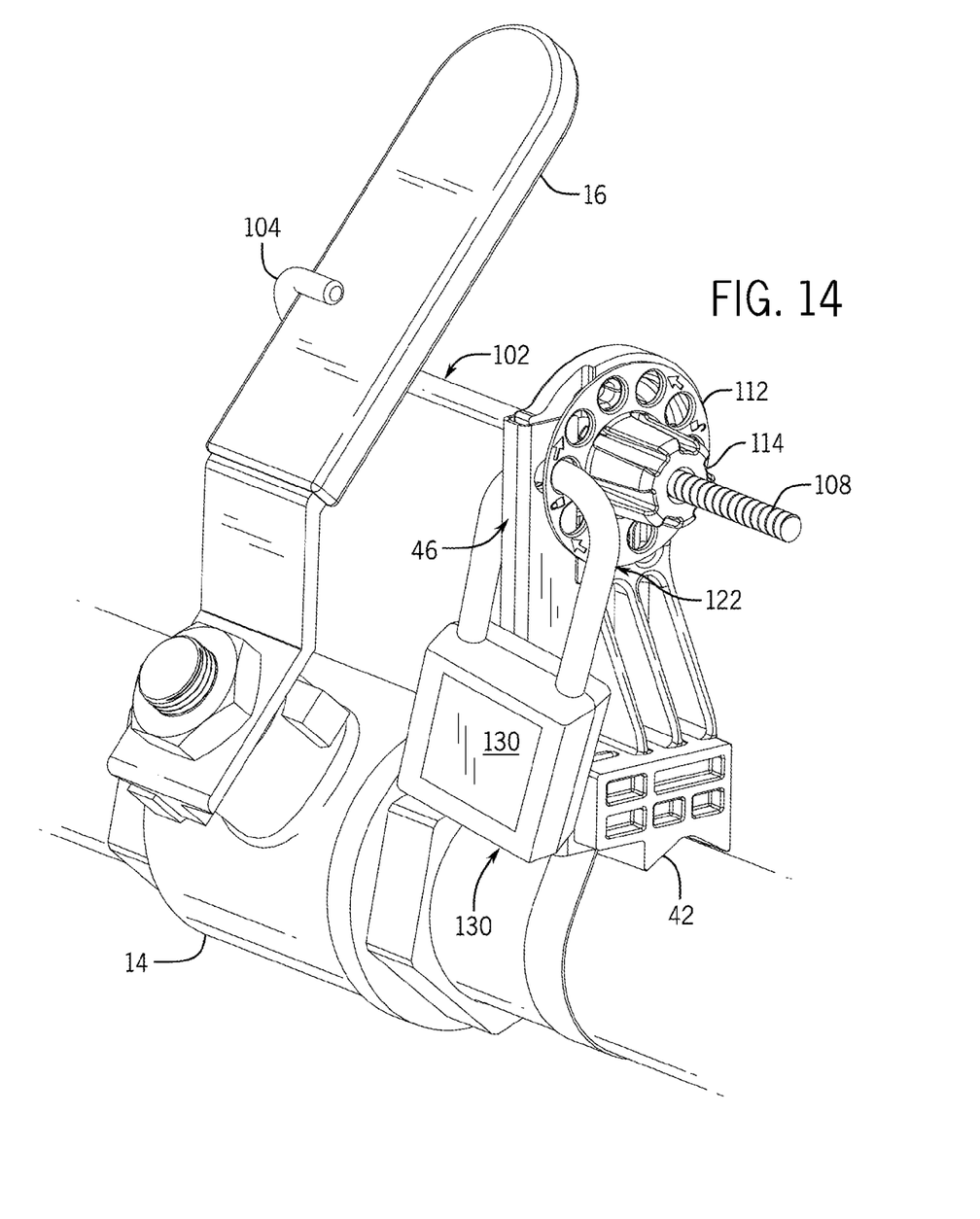
FIG. 14 is an isometric view similar to FIG. 7 showing a padlock received on the lockout device.
Figure 15:
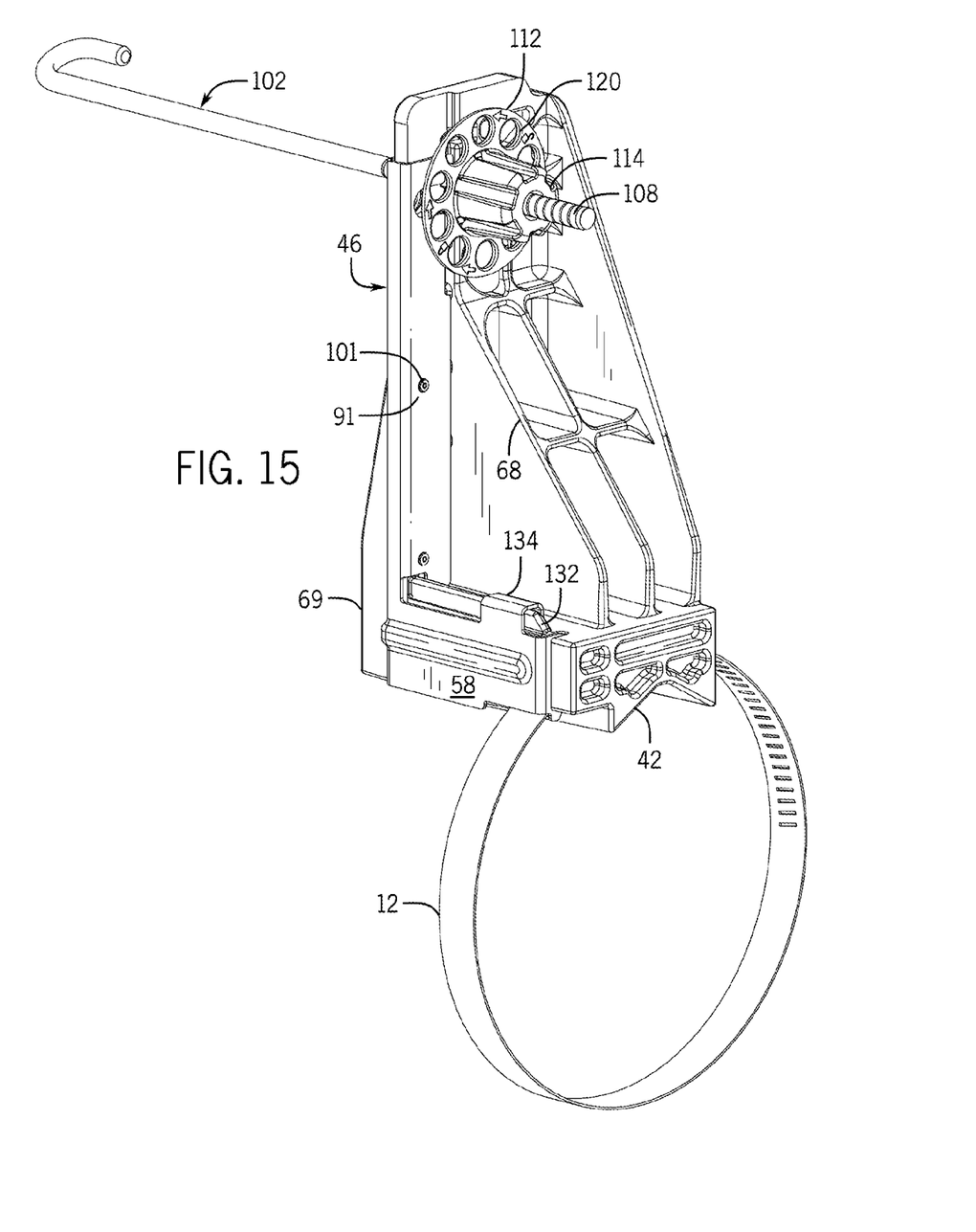
FIG. 15 is an isometric view of an alternate embodiment of a lockout device constructed similarly to the device shows in FIGS. 7-14.

Referring now to FIG. 14 when all of the components are aligned, the apertures 54, 72, and 120 in the body 18, cover 46, and attachment member 112 can receive a clasp, such as the shackle 122 of a padlock 130, as shown here. When the padlock 130 is received on the locking device 10, the position control member 102 is locked into position and the cover 46 is locked onto the base 18 preventing access to the mount adjustment mechanism 26 thereby preventing tampering with the mount 12. As shown in FIG. 15, the mount 12 can be a hose clamp. Alternatively, other types of connecting devices including cable ties, cable locks, and pipe clamps could be used.

Referring again to FIG. 15, here a larger version of the lockout device 10 as described with reference to FIGS. 7-14 is shown. Here the height of the body lock portion 48 is greater than the previous embodiment. As a result, a second rivet hole 96 and rivet 101 is added to couple the cover 46 to the body 18. The strengthening rib 68 on the side opposite the cover extends one full height of the body 18. Thus, the distal end of the body 18 is rectangular, as opposed to disc-shaped. The body 18 includes a strengthening rib 132 that extends upward from the top surface 42 of the mount portion 20, and the cover 46 includes a u-shaped extension 134 that mates with the attachment rib 132. The lockout device 10 of FIG. 15 operates in a manner similar to the lockout device described above with reference to FIGS. 7-14.

Although various materials can be used for each of the components described herein, in one embodiment, the affixed base 18 was constructed of a die cast metal, the cover 46 was constructed of sheet metal, the adjustment mechanism 112 was constructed of plastic, and the position control member 102 of steel. The components could be manufactured from various polymeric materials, machines, cast, or forged materials. Components could also be fabricated from sheet metal alloys, or made of composite materials.

In other forms, the lockout 10 can include a single lock aperture (e.g., the body aperture 54 or the cover aperture 72) that is formed in the component (e.g., the body 18 or the cover 46) that does not define the opening (e.g., hole 110) through which the position control arm 102 is inserted. In other words, as long as the position control arm 102 engages the adjustment member 112 and at least one of the body 18 and the cover 46 (e.g., intersects the path that the cover 46 must traverse to slide away from the body 18 or extends through an opening in the cover 46 or the body 18), a clasp such as padlock 122 can be used to couple the adjustment member 112 to the other of the cover 46 and the body 18, effectively linking the components to prevent relative movement.

The present invention therefore provides a body which can be affixed to a stationary member adjacent a valve and maintained in position for re-use, simplifying the use of a lockout device as compared to typical prior art device. Here, the lockout device is available to lockout the valve whenever it is necessary to lockout the valve, and the only additional steps required are coupling the attachment member to the valve and providing a padlock.

The valve lockout devices ("lockout 10") described above and shown in the accompanying figures illustrate exemplary implementation of the inventive concepts disclosed herein; however, when given the benefit of this disclosure, one skilled in the art will appreciate that the inventive concepts described herein can be modified and incorporated into many other applications. For instance, the inventive concepts can be used in conjunction with other devices, such as those described in U.S. provisional application No. 61/543,455 filed on Oct. 5, 2011 and U.S. provisional application No. 61/543,467 filed on Oct. 5, 2011, both of which are hereby incorporated by reference as if fully set forth herein. Furthermore, throughout the description terms such as front, back, side, top, bottom, up, down, upper, lower, inner, outer, above, below, and the like are used to describe the relative arrangement and/or operation of various components of the example embodiment; none of these relative terms are to be construed as limiting the construction or alternative arrangements that are within the scope of the claims.

While there has been shown and described what is at present considered the preferred embodiments, it will be appreciated by those skilled in the art that various changes and modifications can be made without departing from the scope of the invention defined by the following claims (e.g., the relative proportions and dimension of the components can be altered, and, where applicable, various components can be integrally formed or single components can be separated into multiple pieces).

We claim:

1. A valve lockout device comprising:
a body having a hollow mount portion including a passageway through the body and a body lock portion that extends from the mount portion, the hollow mount portion being sized and dimensioned to receive a mounting device for mounting the body to a stationary member adjacent a valve, and the body lock portion including a body clasp aperture defined therein;
a cover sized and dimensioned to be received on the body and moveable between at least an open and a closed position, the cover including a passageway cover portion sized and dimensioned to enclose at least a portion of the passageway to limit access to the passageway in the closed position, and a cover lock portion that is sized and dimensioned to be received on the body, and that extends from the passageway cover portion, the cover lock portion including a cover clasp aperture;
a position control arm coupled to at least one of the body and the cover for engagement with a valve control; and
an adjustment member coupled to the position control arm, the adjustment member configured to adjust the position of the position control arm to engage and inhibit movement of a valve control, the adjustment member further comprising an adjustment member clasp aperture;
wherein when the cover is slid into a position where the body clasp aperture and the cover clasp aperture are aligned, the cover passageway portion is adjacent to and inhibits access to the passageway in the mount portion; and
wherein when the body aperture, the cover aperture, and the adjustment member aperture are aligned, a clasp is insertable through the body clasp aperture, the cover clasp aperture, and the adjustment member clasp aperture to receive a clasp through the aligned apertures that is securable to inhibit relative movement of the body, the cover, and the adjustment member, and to inhibit movement of the position control member.

2. The valve lockout device of claim 1 wherein the mount portion of the body comprises a polyhedron defining the hollow interior, and where the hollow interior is sized and dimensioned to receive a coupling device for coupling the valve lockout device to a stationary member adjacent a valve.

3. The valve lockout device of claim 1 wherein the passageway cover lock portion is U-shaped and sized and dimensioned to be received on the cover and the upper lock cover portion is U-shaped and sized and dimensioned to be received on the lock portion of the body.

4. The valve lockout device of claim 1 wherein:
the position control arm comprises a threaded adjustment portion; and
the adjustment member comprises a corresponding threaded portion that is configured to engage the threaded adjustment portion of the position control arm such that rotation of the adjustment member axially translates the position control arm.

5. The valve lockout device of claim 1, wherein the adjustment member comprises a central aperture to receive the position control arm, and a plurality of clasp apertures, and the adjustment member is rotatable about the central aperture to align the clasp aperture in the adjustment member with the clasp aperture in the body, and the clasp aperture in the cover.

6. The valve lockout device of claim 1 further comprising a structural member for strengthening the cover lock portion.

7. The valve lockout device of claim 6, wherein the strengthening member comprises a plate coupled between the body and the cover.

8. The valve lockout device of claim 6, wherein the strengthening member comprises a plurality of ribs formed integrally with the body.

9. The valve lockout device of claim 1, wherein the passageway cover portion is U-shaped.

10. A valve lockout device comprising:
a body configured to be coupled to a stationary member adjacent a valve, the body including a mount portion including a hollow interior and a body lock portion comprising at least one body shackle aperture that extends from the mount portion, the hollow interior being sized and dimensioned to receive an attachment device for mounting the body to the stationary member;
a cover positioned adjacent to the body, the cover including a cover mount portion and a cover lock portion extending from an upper surface of the cover mount portion, the cover lock portion comprising a cover shackle aperture;
a valve position control arm coupled to and extending through at least one of the body and the cover, the valve position control arm including a U-shaped end adapted to engage a portion of a valve to inhibit adjustment of the valve;
a shackle aperture formed in at least the other of the body and the cover through which the position control arm extends; and
an adjustment member rotatably coupled to the valve position control arm and adapted to position the U-shaped end, the adjustment member comprising a plurality of adjustment member shackle apertures;
wherein when the adjustment member is rotated to engage the U-shaped end to a valve, one of the plurality of adjustment member apertures aligns with the cover shackle aperture and the body shackle aperture, wherein when a clasp of a lock is received in the aligned apertures, at least a portion of the cover mount portion is aligned adjacent an opening to the hollow interior, thereby inhibiting access to the hollow interior, and the clasp can inhibit relative movement of the body, the cover, and the adjustment member.

11. The valve lockout device of claim 10 wherein the cover is slidably coupled to the body.

12. The valve lockout device of claim 10, further comprising a slot formed in the body, and a rivet hole formed in the cover, wherein a rivet is receivable in the cover and the body to slidably couple the cover to the body.

13. The valve lockout device of claim 10 wherein:
the position control arm includes a threaded adjustment portion; and
the adjustment member comprises a threaded aperture that is configured to engage the threaded portion of the position control arm such that rotation of the adjustment member translates the position control arm axially.

14. The valve lockout device of claim 10, wherein the cover mount portion comprises a planar member adapted to enclose access to at least a portion of the hollow interior of the body when the cover is in a closed position.

15. The valve lockout device of claim 10, wherein the cover mount portion is U-shaped, and the planar member comprises a portion of the U.

* * * * *